(12) United States Patent
Corral Rodriguez et al.

(10) Patent No.: US 8,833,851 B2
(45) Date of Patent: Sep. 16, 2014

(54) HEADREST FOR MOTOR VEHICLE SEATS (75) Inventors: Pedro Corral Rodriguez, Castro Urdiales (ES); Joseba Palacio Argüelles, Santurtzi (ES)

(73) Assignee: S Coop Batz, Igorre (Bizkaia) (ES)

( * ) Notice: Subject to any disclaimer, the term of this patent is extended or adjusted under 35 U.S.C. 154(b) by 298 days.

(21) Appl. No.: 13/477,327

(22) Filed: May 22, 2012

(65) Prior Publication Data

US 2012/0299355 A1    Nov. 29, 2012

(30) Foreign Application Priority Data

May 23, 2011   (ES) .................................. 201130829

(51) Int. Cl.
*B60N 2/48*    (2006.01)
(52) U.S. Cl.
CPC .................... *B60N 2/4885* (2013.01)
USPC ................. 297/216.12; 297/216.14
(58) Field of Classification Search
USPC ........................ 297/216.12, 216.14
See application file for complete search history.

(56) References Cited

U.S. PATENT DOCUMENTS

| | | | | |
|---|---|---|---|---|
| 6,082,817 | A * | 7/2000 | Muller ..................... | 297/216.12 |
| 6,688,697 | B2 | 2/2004 | Baumann et al. | |
| 7,195,313 | B2 * | 3/2007 | Hippel et al. ............. | 297/216.12 |
| 7,770,967 | B2 * | 8/2010 | Hirota et al. ............. | 297/216.12 |
| 7,878,452 | B2 * | 2/2011 | Mastrolia ................ | 244/122 AG |
| 8,075,051 | B2 * | 12/2011 | Vitali ..................... | 297/216.12 |
| 8,191,830 | B2 * | 6/2012 | Mastrolia ................ | 244/122 AG |
| 2005/0127726 | A1 | 6/2005 | Schilling et al. | |
| 2010/0109396 | A1 * | 5/2010 | Vitali ..................... | 297/216.12 |
| 2010/0155535 | A1 * | 6/2010 | Mastrolia ................ | 244/122 AG |
| 2011/0084167 | A1 * | 4/2011 | Mastrolia ................ | 244/122 AG |
| 2011/0291448 | A1 * | 12/2011 | Hashimoto ............. | 297/216.14 |
| 2012/0261968 | A1 * | 10/2012 | Bittinger et al. .......... | 297/391 |

FOREIGN PATENT DOCUMENTS

| | | |
|---|---|---|
| DE | 3900495 A1 | 7/1990 |
| DE | 10033913 A1 | 1/2002 |
| DE | 102005059693 A1 | 12/2005 |
| EP | 0974484 A2 | 1/2000 |

(Continued)

OTHER PUBLICATIONS

Spanish Search Report (ISR) for Spanish Patent Application No. 201130829, Date of Mailing Mar. 13, 2013, 6 pages, Spanish Patent Office, Madrid Spain.

(Continued)

*Primary Examiner* — David E Allred
(74) *Attorney, Agent, or Firm* — Tim L. Kitchen; Peter B. Scull; Hamilton DeSanctis & Cha, LLP.

(57) ABSTRACT

A headrest. In one implementation the headrest includes a moving part that is rotationally coupled to a fixed part between a rest position and an active position. A connection assembly connects the moving part to the fixed part. An articulation assembly is operably coupled to and between the fixed part and the moving and has a first configuration when the moving part is in the rest position and a second configuration when the moving part is in the active position. The headrest includes a drive device that is moveable between first and second positions. In the first position the drive device is decoupled from the articulation assembly so that the articulation assembly assumes the first configuration, when in the second position the drive device acts upon articulation assembly to cause the articulation assembly to assume the second configuration.

24 Claims, 6 Drawing Sheets

(56) References Cited

FOREIGN PATENT DOCUMENTS

| | | |
|---|---|---|
| EP | 1193114 A1 | 4/2002 |
| EP | 1526982 B1 | 3/2006 |
| EP | 1403133 B1 | 4/2009 |
| EP | 2116416 A1 | 11/2009 |
| EP | 2147821 A1 | 1/2010 |
| ES | 1052173 | 11/2002 |
| ES | 2304100 A1 | 9/2008 |
| ES | 2344496 A1 | 8/2010 |
| GB | 2363323 B1 | 2/2004 |
| WO | WO 2004014688 A1 * | 2/2004 ............. B60N 2/427 |
| WO | WO2004/039626 A1 | 5/2004 |

OTHER PUBLICATIONS

Partial English Translation of Spanish Search Report (ISR) for Spanish Patent Application No. 201130829, Date of Mailing Mar. 13, 2013, 2 pages, Spanish Patent Office, Madrid Spain.

* cited by examiner

HEADREST FOR MOTOR VEHICLE SEATS

CROSS-REFERENCE TO RELATED APPLICATIONS

This application relates to and claims priority to Spanish Patent Application Serial No. P201130829, filed May 23, 2011.

TECHNICAL FIELD

This invention relates to headrests for motor vehicle seats.

BACKGROUND

There are known headrests, known as active headrests, that comprise two parts, a fixed part and a moving part, the moving part being movable, in the event that the vehicle receives a rear impact, from a rest position, in which the moving part is attached to the fixed part, to an active position. In the active position, the moving part is separated from the fixed part and moved towards the occupant of the seat, thereby reducing the distance the head of the occupant travels until it is supported on the headrest, and thereby reducing the risk of the occupant suffering whiplash.

European Patent No. 1403133 B1 describes an active headrest with a padded body to cushion the impact on the head of the occupant of the vehicle. This padded body houses an actuation device and from the padded body project two rods that connect to the seat. The actuation device of the headrest comprises a fixed part and actuation means supported by the fixed part and adapted to be fitted to adjust the position of the padded body in relation to the rods. The fixed part supports connection means for the actuation means. The actuation means comprises a moving part in relation to the fixed part, which is adapted to support part of the padded body. Connection means connects the rods to the fixed part.

The actuation means also comprises levers and a pyrotechnic drive device. The levers are articulated at one end to the fixed part by means of its connection means, and at the other end to the moving part. The pyrotechnic drive device is connected to the fixed part and to the levers to make them rotate in relation to the fixed part.

SUMMARY OF THE DISCLOSURE

In one implementation a headrest is provided that comprises a fixed part, a moving part movable in relation to the fixed part from a rest position to an active position, at least one connection means or assembly that connects the fixed part and the moving part to determine the path and the position of the moving part, and a drive system that comprises a drive device connected to the fixed part, to drive and move the moving part in relation to the fixed part. The drive system also comprises an articulated device or assembly pivotally connected at its ends to the fixed part and to the moving part and with at least one pivoting intermediate connection, the drive device cooperating operationally with the articulated device.

In one implementation the drive system includes, in addition to the drive device, the articulated device/assembly, the drive device cooperates with the articulated device/assembly and not with the connection means/assembly that position the moving part, thereby separating and making the drive, and therefore the movement and displacement of the moving part in relation to the fixed part, independent from the path and final positioning of the moving part.

In the prior art the drive device is connected to the connection means, which are connected at their ends to the fixed part and to the moving part, so that on driving them, they make them rotate and in their circular travel they determine the path and final position of the moving part.

An advantage of the drive systems disclosed and contemplated herein is that it allows the moving part to be driven to its active position irrespective of the way of fixing the path and final position, thereby resulting in more flexible headrest manufacturing systems, with a greater range and a reduced final cost.

These and other advantages and characteristics of the invention will be made evident in the light of the drawings and the detailed description thereof.

DETAILED DESCRIPTION

Figure 1:
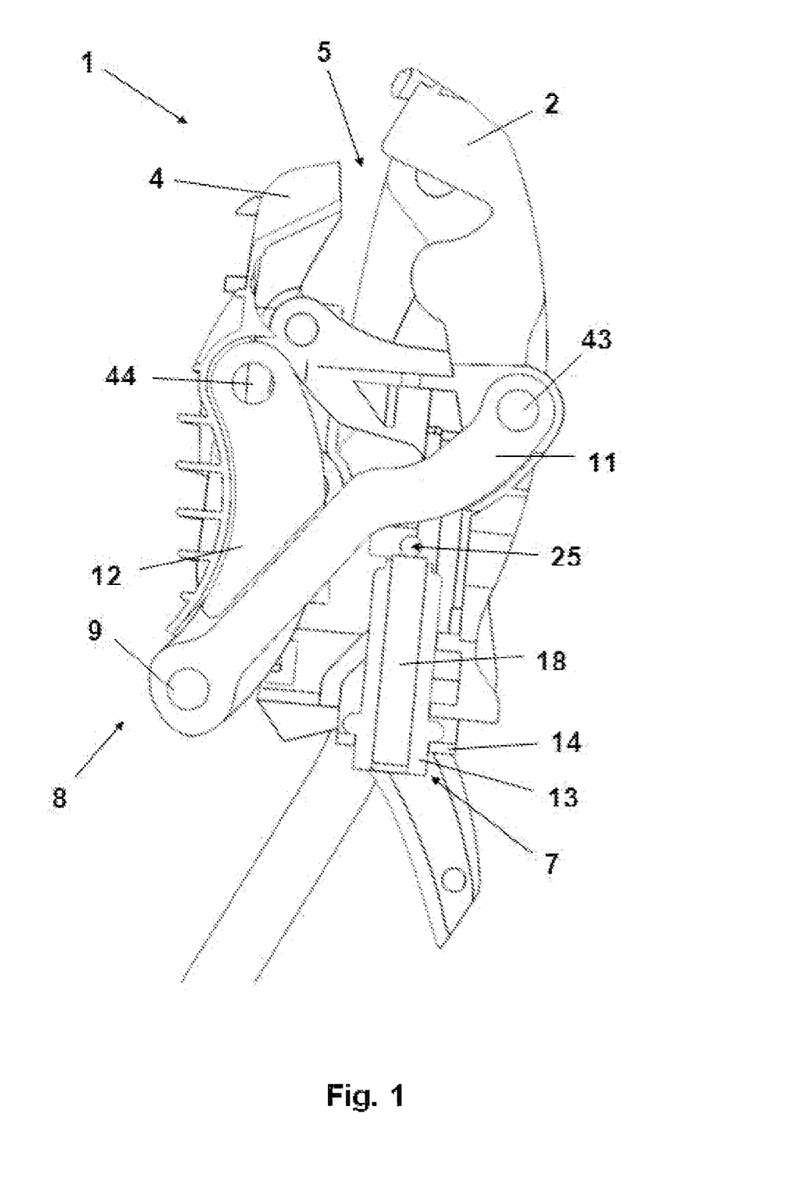
FIG. 1 shows a schematic profile view of an implementation of a headrest with the moving part being in a rest position.
Figure 2:
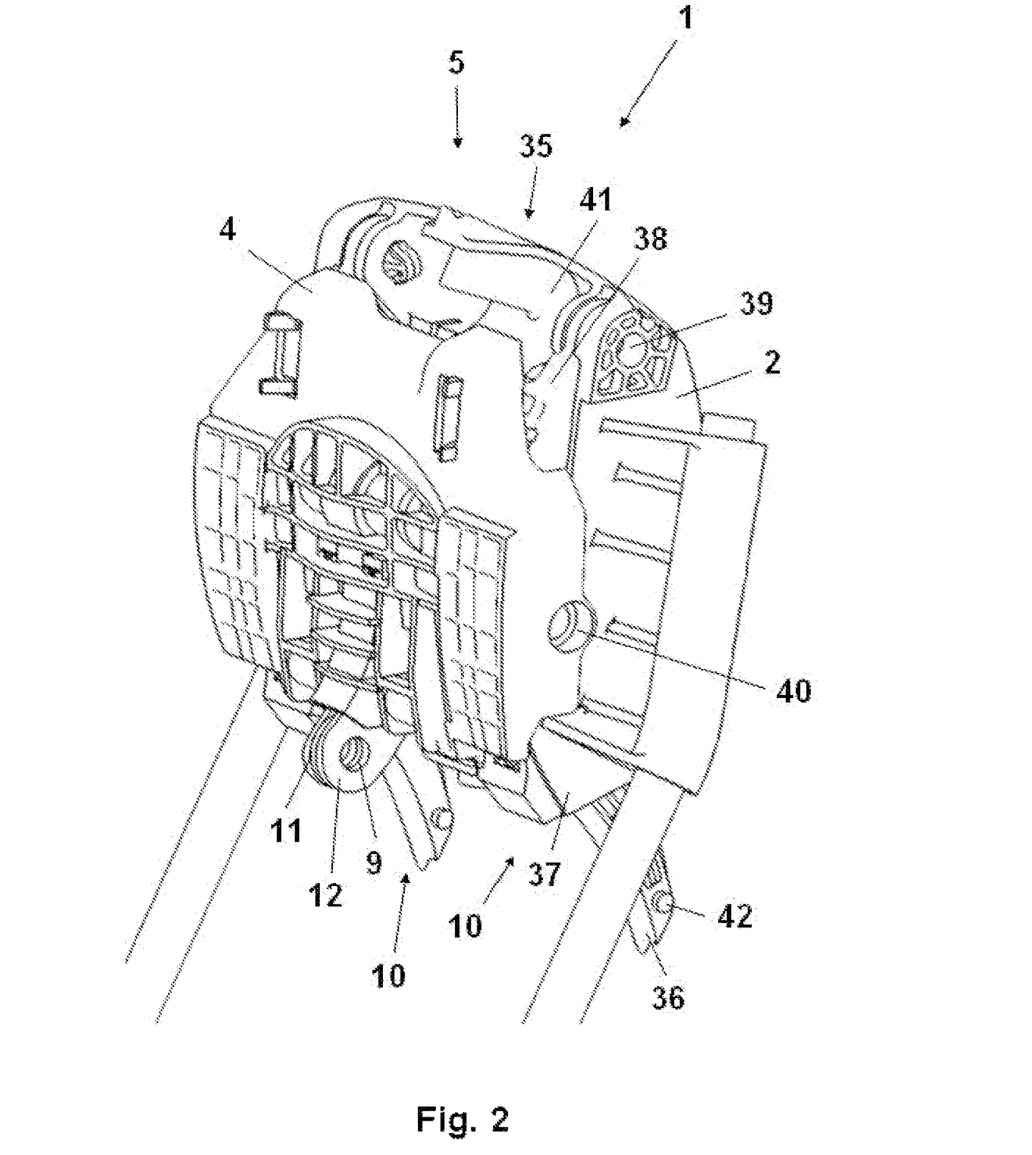
FIG. 2 shows a perspective view of the implementation of FIG. 1, the moving part being in a rest position.
Figure 3:
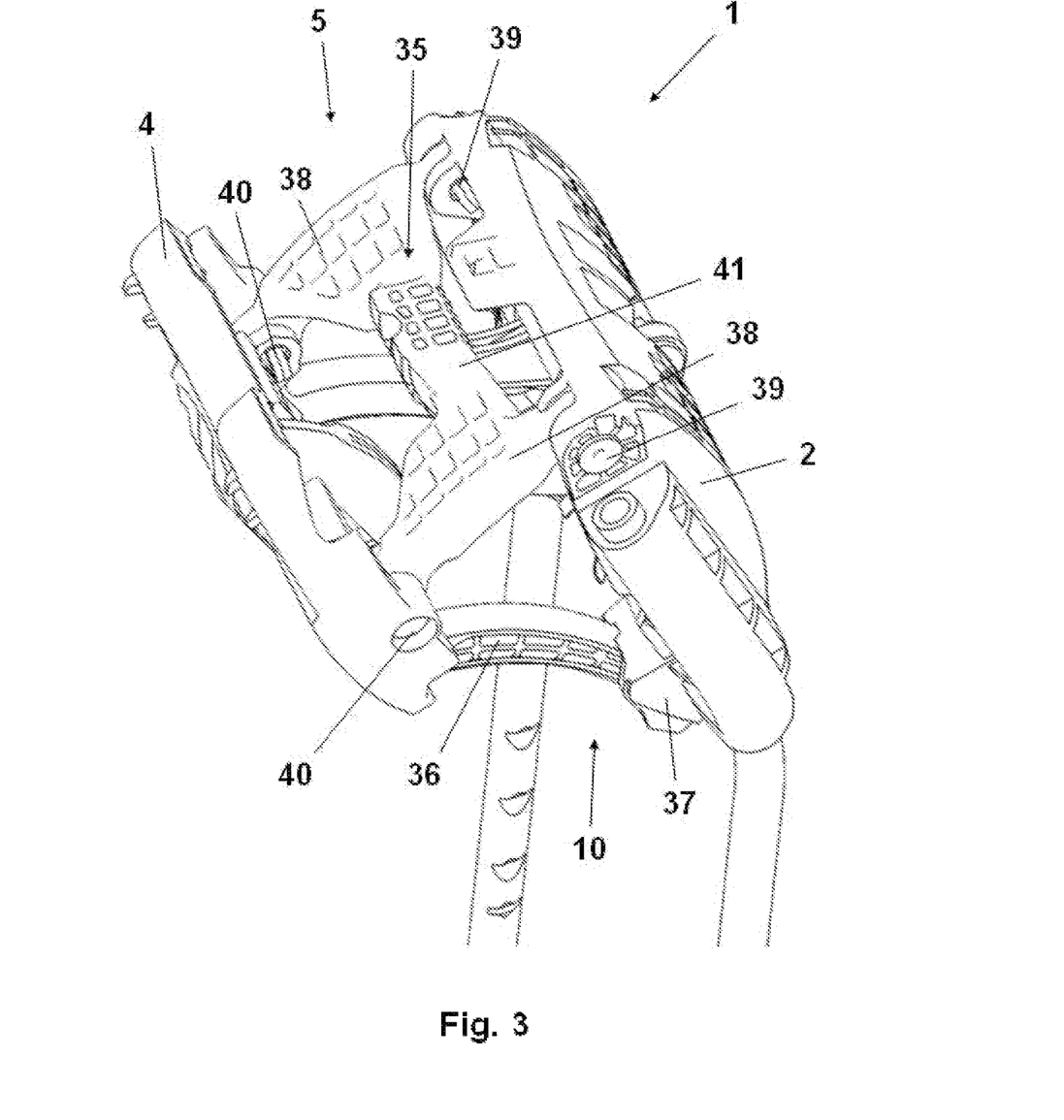
FIG. 3 shows a perspective view of the implementation of FIG. 1, the moving part being in its active position.
Figure 4:
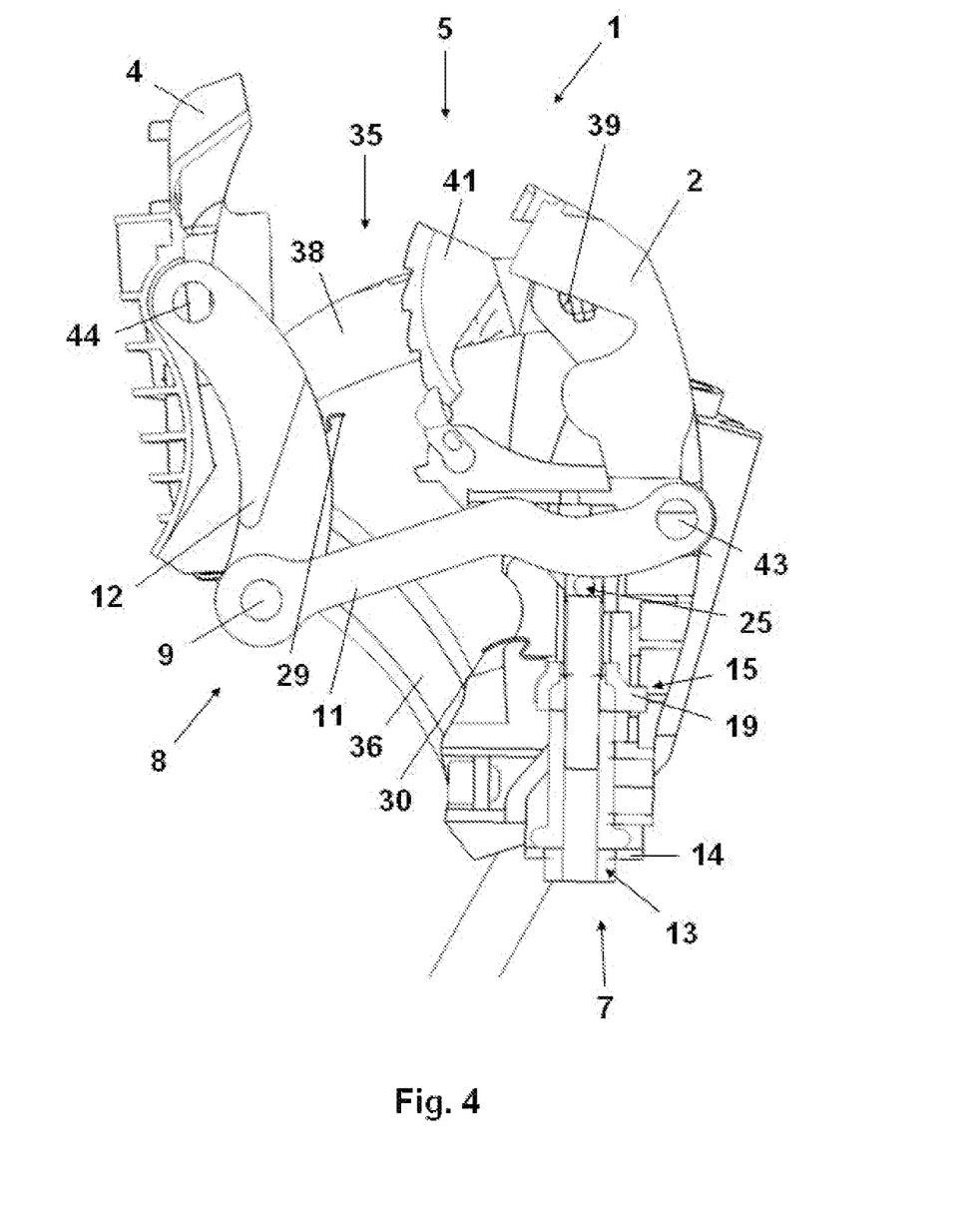
FIG. 4 shows a profile view in a longitudinal cross-section of the implementation of FIG. 1, the moving part being in its active position.
Figure 5:
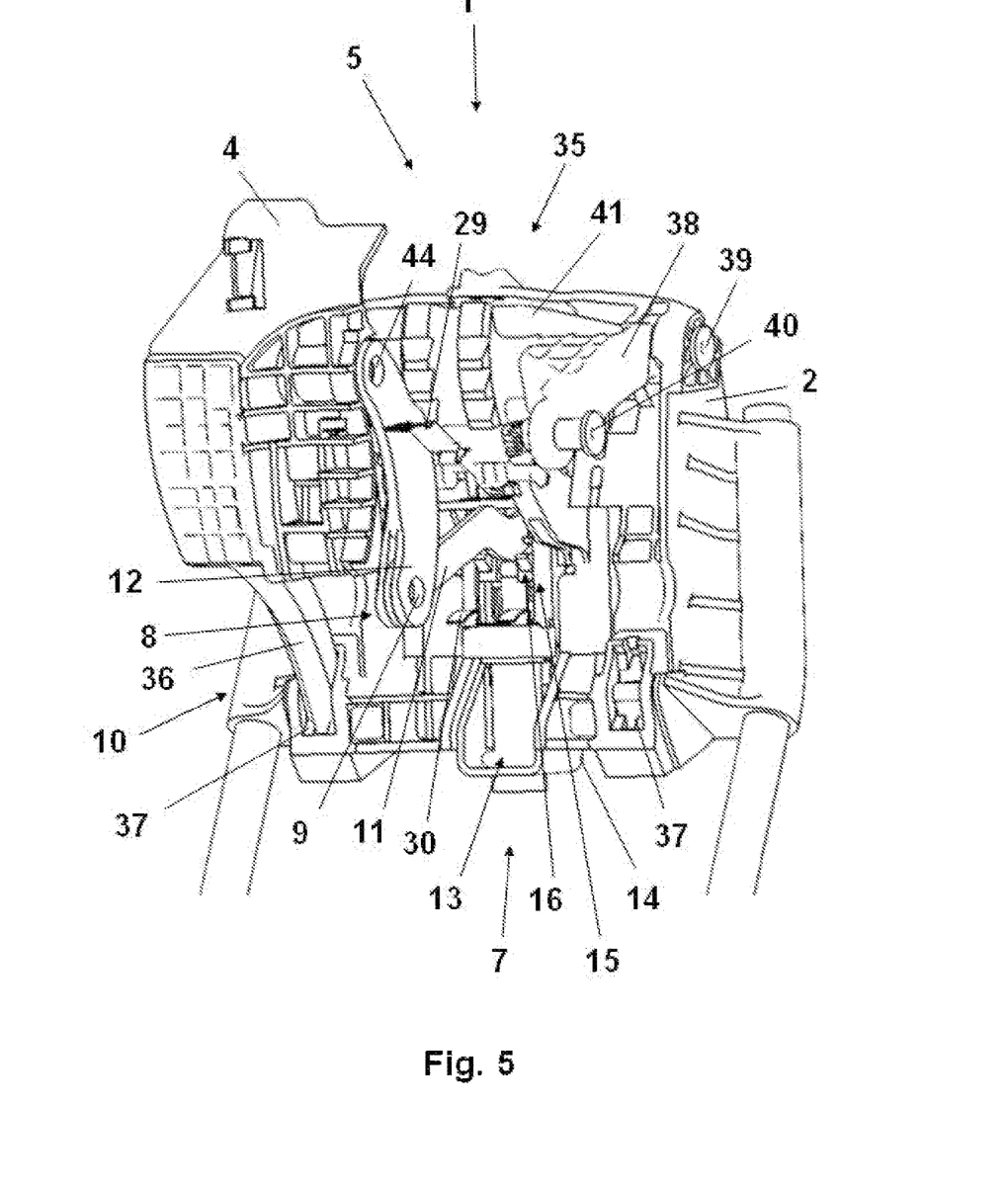
FIG. 5 shows a perspective view in a longitudinal cross-section of the implementation of FIG. 1, the moving part being in its active position.

FIGS. 1 to 5 illustrate a headrest according to one implementation. In the implementation shown in FIGS. 1 to 5 the headrest 1 comprises a fixed part 2, a moving part 4, at least one connection means/assembly 5 connected in a pivoting manner to the fixed part 2 and to the moving part 4, and a drive system. The moving part 4 is movable in relation to the fixed part 2 from a rest position (FIGS. 1 and 2) to an active position (FIGS. 3, 4 and 5).

The connection means/assembly 5 comprises in this implementation, as can be seen in FIGS. 2 and 3, an upper arm 35 and two lower lateral connection means 10. The upper arm 35 comprises two side levers 38, one of the ends of each side lever 38 pivoting in relation to a respective shaft 39 disposed on the fixed part 2, both shafts 39 being coaxial, and the other of the ends of each side lever 38 pivoting in relation to a respective shaft 40 of the moving part 4, both shafts 40 being coaxial. The upper arm 35 also comprises a central body 41 by means of which both side levers 38 are connected to each other.

The lower connection means 10 comprise a guide arm 36 connected to the moving part 4 and a channel 37 disposed in the fixed part 2. The moving part 4 is guided to the fixed part 2 by means of the connection between the guide arm 36 and the channel 37, and the slope of the moving part 4 in its rest position, in its active position and at all the points of the path from the rest position to the active position is determined by the connection between the guide arm 36 and the channel 37. The connection is defined by the design of the outline of the guide arm 36, which fits with the height of the channel 37 for all the positions of the required path of the moving part 4. The guide arm 36 also comprises a stopper 42 that is housed in one of the transverse holes of the guide arm 36, and which delimits the furthest position of the moving part 4 in relation to the fixed part 2. The guide arm 36 may have various transverse holes, so that a choice may be made between different final positions of the moving part 4 depending on the hole in which the stopper 42 is housed. As a result, with the design chosen for the guide arm 36 and the channel 37, and with the selection of the position of the stopper 42, the path and the final position of the moving part 4 is defined, thereby minimising the risk of the occupant of the vehicle suffering whiplash in the event of a collision. In one implementation, the guide arm defines a curving path.

The drive system, as shown in FIGS. 1 and 4, comprises a drive device 7 that is connected in an attached manner to the fixed part 2, and its sole function is to cause movement, in other words, it is used to drive and move the moving part 4 in relation to the fixed part 2. The drive system also comprises an articulated device/assembly 8 that is connected in a pivoting manner at its ends to the fixed part 2 and to the moving part 4, and is disposed with at least one pivoting intermediate connection 9, the drive device 7 cooperating operationally with the articulated device/assembly 8.

As a result, in one implementation the drive device 7 cooperates with the articulated device/assembly 8 and not with the upper arm 35 or with the lower lateral connection means 10, which position the moving part 4, as a result of which the drive, or in other words the movement of the moving part 4 in relation to the fixed part 2, and the path that the moving part 4 takes and its final position separate from each other and become independent, which as described above, is achieved with the design of the upper arm 35 and of the lower lateral connection means 10.

The articulated device 8 comprises in one implementation a first arm 11 connected in a pivoting manner at one of its ends to the fixed part 2 in relation to a shaft 43 and to the pivoting intermediate connection 9, and a second arm 12 connected at one of its ends to the pivoting intermediate connection 9 and the other end pivoting in relation to a shaft 44 of the moving part 4. In one implementation the second arm 12 opens into two parts in the area of the pivoting intermediate connection 9, so that it holds in the connection the first arm 11, as shown in FIG. 5.

Figure 6:
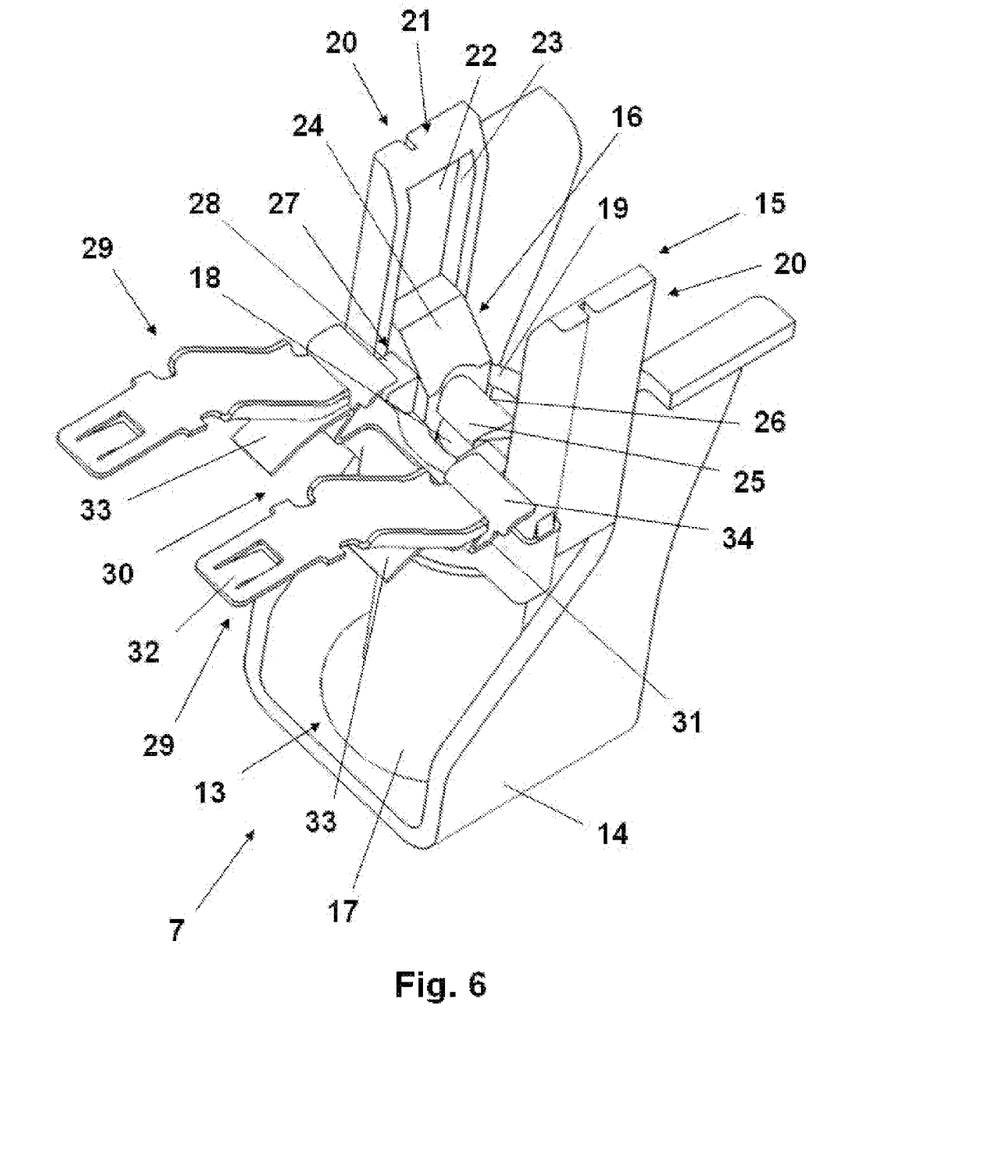
FIG. 6 shows a perspective view of an implementation of the drive device in a rest position.

As shown in FIG. 6, the drive device 7 comprises in one implementation a pyrotechnic drive device 13, a support of the pyrotechnic drive device 14, a drive plate 16 that is driven by the pyrotechnic drive device 13, and a drive guide 15 that guides the drive plate 16. In one implementation the pyrotechnic drive device 13 is supported in the support 14, which is preferably a U-shaped metal piece, the support 14 being disposed in its base with a hole that enables the insertion and the support of the base of the pyrotechnic drive device 13. In one implementation the support 14 is disposed in its body with connection members that allow it to be connected to the fixed part 2 of the headrest 1 and, as a result, the pyrotechnic drive device 13 is also connected to the fixed part 2. In one implementation the pyrotechnic drive device 13 comprises a body 17, in the interior of which there is disposed a pyrotechnic load, and a bolt or shaft 18 that may move from a rest position to a final position when the pyrotechnic load is activated on the arrival of an electric signal from a sensor after a collision has occurred.

In one implementation the drive guide 15 comprises a central body 19 that is disposed with connection members that allow it to be connected to the fixed part 2 of the headrest 1. In one implementation the central body 19 is supported and is connected to the upper part of the body 17 of the pyrotechnic drive device 13. In one implementation the drive guide 15 also comprises two side arms 20 that project out of the central body 19. In one implementation the side arms 20 are disposed on their inner face 21, along their length, with a flat area 22 fitted between two side notches 23 to guide the drive plate 16.

In one implementation the drive plate 16 comprises two bodies 24 that fit in the inner faces 21 of the side arms 20 of the drive guide 15, and a shaft 25 that is fitted between the two bodies 24, to leave the central part 26 of it free. Each of the bodies 24 of the drive plate 16 comprises, on the lateral face facing the interior of the headrest 1, a projection 27, attached to the body 24, with a substantially flat upper face 28.

The drive device 7 thus defined is a simple unit to assemble, as the various pieces are combined with each other and fit into each other with simple movements, and it is a sufficiently rigid unit, as the connections are made by the fitting and the introduction of connection members. In one implementation this is achieved by the use linear walls and "T" into grooves. In addition the drive device 7 as a unit is firmly referenced to the fixed part 2 of the headrest 1 as it is securely connected to it.

As shown in the implementation of FIG. 1, when the headrest 1 is in its rest position, the fixed part 2 and the moving part 4 are connected and form a single compact body. In this arrangement the pyrotechnic drive device 13 is not activated, and the bolt/shaft 18 is in its rest position, in other words withdrawn inside the body 17 of the pyrotechnic drive device 13. In this situation the drive plate 16 is in its low position in relation to the drive guide 15, and the bolt 18 of pyrotechnic drive device 13 is positioned beneath the central part 26 of the shaft 25 of the drive plate 16, close to the shaft 25 of the drive plate 16.

In this rest situation of the headrest 1, the articulated device 8 of the drive system is withdrawn, and the first arm 11 of the articulated device 8 is positioned above the upper area of the central part 26 of the shaft 25 of the drive plate 16, close to the shaft 25 of the drive plate 16.

In one implementation, as shown in FIGS. 4, 5 and 6, a retaining means/retaining mechanism connects the fixed part 2 and the moving part 4, which prevent the headrest 1 from being opened manually, and its interior may be accessed and its various members handled. In one implementation the retaining means/retaining mechanism comprise two moving hooks 29 and a fixed hook 30, the fixed hook 30 comprising a central body and two arms 33 that project out of the central body. The moving hooks 29 and the arms 33 of the fixed hook 30 are connected at intermediate areas of both in the direction facing the interior of the headrest 1, in an area of connection 31, when the headrest 1 is in the rest position. The moving hooks 29 are preferably metal pieces, and are connected at one end 32, opposite to the area of connection 31, to the moving part 4 of the headrest 1 by means of an elastic connection means. The fixed hook 30 is also preferably a metal piece that is connected at the sides of its central body to the side of the central body 19 of the drive guide 15 facing the interior of the headrest 1, at connection members disposed for that purpose. The area of connection 31 is configured on both hooks, in this implementation, in a U shape, with the open area being narrower than the closed area, so that the U of the moving hooks 29 and of the side arms 33 of the fixed hook 30 may fit and maintain their connection. In this situation the headrest 1 forms a single compact body, with the fixed part 2 and the moving 4 part being connected inseparably by manual means.

In one implementation the moving hooks 29 comprise at the end facing the interior of the headrest 1, and projecting out of the area of connection 31 with the fixed hook 30, a substantially flat flange 34 that projects out and is supported on the upper face 28 of the projection 27 of the body 24 of the drive plate 16.

When the headrest 1 is in its rest position, the fixed part 2 and the moving part 4 are connected and form a single compact body, the pyrotechnic drive device 13 is not activated, and the bolt/shaft 18 is in its rest position. In this situation the drive plate 16 is in its low position, and the central part 26 of the shaft 25 of the drive plate 16 is positioned over the end of the bolt 18 of the pyrotechnic drive device 13 and close to the end of the bolt 18. In this same rest situation, the articulated device/assembly 8 is withdrawn, and the first arm 11 of the device is positioned above the upper area of the central part 26 of the shaft 25 of the drive plate 16, close to the shaft 25.

When a collision occurs, the pyrotechnic load of the body 17 of the pyrotechnic drive device 13 is activated on the arrival of an electric signal from a sensor. The bolt/shaft 18 is then activated and moves from the rest position to the active position, as shown in FIG. 4. In this movement between the two positions, two stages are contemplated and which occur in a continuous manner; a first stage in which the bolt/shaft 18 travels the distance that separates it from the central part 26 of the shaft 25 of the drive plate 16, and in its movement, comes into contact with the shaft 25, driving it and moving the drive plate 16. With the movement of the drive plate 16, its bodies 24 slide all the way along the flat areas 22 of the side arms 20 of the drive guide 15. As the projections 27 of the bodies 24 are attached to them, they are also moved, and due to the fact that the flanges 34 of the moving hooks 29 are supported on the upper faces 28 of the projections 27, the flanges 34 are also moved. Due to this movement, to the fact that the fixed hook 30 is connected to the drive guide 15 and that this is connected to the fixed part 2, and to the fact that the moving hooks 29 and the side arms 33 of the fixed hook 30 are connected in an area of connection 31 with a U shape, the connection 31 is released and the fixed part 2 and the moving part 4 that formed a compact connection when at rest, are also released.

In the second stage, according to one implementation, the bolt/shaft 18 continues the movement and travels the distance that separates it from its final active position. Following the distance traveled in the first stage, the upper area of the central part 26 of the shaft 25 of the drive plate 16 comes into contact with the lower area of the first arm 11 of the articulated device 8 and pushes it, and drives and moves it as a result. Due to the driving action, as the first arm 11 of the articulated device/assembly 8 is connected in a pivoting manner at one of its ends to the fixed part 2 in relation to the shaft 43 and to the pivoting intermediate connection 9, and the second arm 12 of the articulated device 8 is connected at one of its ends to the pivoting intermediate connection 9 and the other end pivoting in relation to the shaft 44 of the moving part 4, the second arm 12 is also driven and tilts in the pivoting intermediate connection 9. As a result, the moving part 4 is driven and displaced, and therefore made to move, it being moved in relation to the fixed part 2 from a rest position to an active position.

In known headrests the path and the final position of the moving part depends on and is related to the design of the drive device and the connection means, thereby making each headrest design unique, According to the headrests of the present invention, the drive system is not dependent on the type of headrest where it is to be applied, as it is providing drive and movement, and the path and final position of the moving part 4 is defined by the connection means 5 that connect the fixed part 2 and the moving part 4, thereby achieving more flexible headrest manufacturing systems, resulting in a wider range and a reduced final cost.

As the drive device 7 is attached to the fixed part 2, and as it is not directly connected to the connection means 5, it is made possible that the bolt/shaft 18 in its rectilinear movement, from a rest position to an active position, activates various mechanisms, performing operations in a simple manner, making use of the path. In one implementation, for example, the drive device first of all activates the retaining mechanism of the headrest 1, which must be released to enable the headrest 1 to reach the active position, and then drive the articulated device/assembly 8 to move the moving part 4 in relation to the fixed part 2 from a rest position to an active position.

Given that, according to some implementations, a pyrotechnic drive device 13 is used, the time in which the headrest 1 is deployed from its rest position to its active position is greatly reduced in relation to other known headrests that do not use this type of drive device, thereby enabling the moving part 4 of headrest 1 to position itself more quickly in its active position in the event of a collision.

What is claimed is:

1. A headrest for a motor vehicle seat, the headrest comprising:
   a fixed part,
   a moving part movable in relation to the fixed part, the moving part moveable between a rest position and an active position, in the rest position the moving part is rotated toward the fixed part, in the active position the moving part is rotated away from the fixed part,
   a connection assembly that connects the moving part to the fixed part, the connection assembly defining the travel path of the moving part as it moves between the rest position and the active position,
   an articulation assembly separate from the connection assembly, the articulation assembly having a first part pivotally coupled to the fixed part and a second part pivotally coupled to the moving part, the articulation assembly having a first configuration when the moving part is in the rest position and a second configuration when the moving part is in the active position, and
   a drive device moveable between a first position and a second position, in the first position the drive device is decoupled from the articulation assembly so that the articulation assembly assumes the first configuration, when in the second position the drive device acts upon articulation assembly to cause the articulation assembly to assume the second configuration.

2. The headrest according to claim 1, wherein the first part of the articulation assembly comprises a first arm with first and second ends and the second part of the articulation assembly comprises a second arm with first and second ends, the first end of the first arm pivotally attached to the fixed part, the first end of the second arm pivotally attached to the moving part, each of the second ends of the first and second arms pivotally coupled to one another.

3. The headrest according to claim 2, wherein the first arm comprises an intermediate portion located between the first and second ends, the drive device adapted to act upon the intermediate portion of the first arm as it moves from the first position to the second position to cause the articulation assembly to assume the second configuration.

4. The headrest according to claim 1, further comprising a retaining mechanism, in a retaining position the retaining mechanism holds the moving part in the rest position and in a release position the retaining mechanism releases the moving part to permit the moving part to assume the active position, the drive device having an intermediate position between the first position and the second position, the drive device adapted to act upon the retaining mechanism to cause the retaining mechanism to transition from the retaining position to the release position when the drive device assumes the intermediate position.

5. The headrest according to claim 1, wherein the drive device comprises a shaft located within a housing that is connected to the fixed part, the shaft having a distal end and being moveable between a rest position and a final position, the drive device further comprising a driven element that is situated to be acted upon and moved by the distal end of the shaft as the shaft transitions from the rest position to the final position, the path of the driven element being established by a drive guide that is connected to the fixed part, the driven element adapted to act upon the articulation assembly to cause the articulation element to transition from the first configuration to the second configuration as the shaft moves between the rest position to the final position.

6. The headrest according to claim 5, wherein the drive device comprises a pyrotechnic load situated in the housing and adapted to act upon the shaft to cause the shaft to move between the rest position and the final position.

7. The headrest according to claim 5, wherein the driven element is positioned between first and second opposing drive plates and wherein the drive guide comprises a body that is connected to the fixed part, the drive guide having first and second opposing side arms that each project out of the body, the first and second drive plates and the first and second side arms having complementary geometries that result in each of the first and second side arms being guided within each of the first and second guide plates, respectively.

8. A headrest according to claim 4, wherein the retaining mechanism comprises at least one moving hook connected to the moving part and at least one fixed hook connected to the drive device, the at least one fixed hook having at least one arm, the moving hook and the arm being connected in an area of connection when the moving part is in the rest position.

9. A headrest according to claim 4, wherein the retaining mechanism comprises at least one moving hook having a first end connected to the moving part and at least one fixed hook connected to the drive device, the at least one fixed hook having at least one arm, the moving hook and the arm being connected in an area of connection when the moving part is in the rest position, the drive device comprising a shaft located within a housing that is connected to the fixed part, the shaft having a distal end and being moveable between a rest position and a final position, the drive device further comprising a driven element that is situated to be acted upon and moved by the distal end of the shaft as the shaft transitions from the rest position to the final position, the path of the driven element being established by a drive guide that is connected to the fixed part, the driven element adapted to act upon the articulation assembly to cause the articulation assembly to transition from the first configuration to the second configuration as the shaft moves between the rest position to the final position, the driven element being positioned between first and second opposing drive plates, the drive guide comprising a body that is connected to the fixed part, the drive guide having first and second opposing side arms that each project out of the body, the first and second drive plates and the first and second side arms having complementary geometries that result in each of the first and second side arms being guided within each of the first and second guide plates, respectively, at least one of the drive plates comprises a projection and the moving hook comprises at an end opposite to the first end a flange that projects out and is supported on an upper face of the projection.

10. The headrest according to claim 1, wherein the connection assembly delimits the furthest position the moving part is able to be rotated away from the fixed part, the furthest position corresponding to the active position of the moving part.

11. The headrest according to claim 1, wherein the connection assembly comprises a curved arm having a first end pivotally connected to the moving part, the fixed part having a channel that receives the curved arm, the curved arm and channel defining the rotation path of the moving part as it moves from the rest position to the active position.

12. The headrest according to claim 1, wherein the connection assembly comprises first and second curved lateral arms, each of the first and second curved lateral arms having a first end connected to the moving part, the fixed part having first and second channel that respectively receive the first and second curved lateral arms, the first and second curved lateral arms and the first and second channels defining the rotation path of the moving part as it moves from the rest position to the active position.

13. A headrest according to claim 12, wherein the connection assembly comprises an upper arm having two side levers, each of the side levers having a first end pivotally connected to the fixed part and a second end pivotally connected to the moving part.

14. A headrest for a motor vehicle seat, the headrest comprising:
a fixed part,
a moving part movable in relation to the fixed part, the moving part moveable between a rest position and an active position, in the rest position the moving part is rotated toward the fixed part, in the active position the moving part is rotated away from the fixed part,
a connection assembly that connects the moving part to the fixed part, the connection assembly defining the travel path of the moving part as it moves between the rest position and the active position,
an articulation assembly separate from the connection assembly, the articulation assembly comprising a first arm with first and second ends and a second arm with first and second ends, the first end of the first arm pivotally attached to the fixed part, the first end of the second arm pivotally attached to the moving part, each of the second ends of the first and second arms pivotally coupled to one another, the articulation assembly having a first configuration when the moving part is in the rest position and a second configuration when the moving part is in the active position, and
a drive device moveable between a first position and a second position, in the first position the drive device is decoupled from the articulation assembly so that the articulation assembly assumes the first configuration, when in the second position the drive device acts upon the first arm to cause the articulation assembly to assume the second configuration.

15. The headrest according to claim 14, wherein the first arm comprises an intermediate portion located between the first and second ends, the drive device adapted to act upon the intermediate portion of the first arm as it moves from the first position to the second position to cause the articulation assembly to assume the second configuration.

16. The headrest according to claim 14, further comprising a retaining mechanism, in a retaining position the retaining mechanism holds the moving part in the rest position and in a release position the retaining mechanism releases the moving part to permit the moving part to assume the active position, the drive device having an intermediate position between the first position and the second position, the drive device adapted to act upon retaining mechanism to cause the retaining mechanism to transition from the retaining position to the release position when the drive device assumes the intermediate position.

17. The headrest according to claim 14, wherein the drive device comprises a shaft located within a housing that is connected to the fixed part, the shaft having a distal end and being moveable between a rest position and a final position, the drive device further comprising a driven element that is situated to be acted upon and moved by the distal end of the shaft as the shaft transitions from the rest position to the final position, the path of the driven element being established by a drive guide that is connected to the fixed part, the driven element adapted to act upon the articulation assembly to cause the articulation element to transition from the first configuration to the second configuration as the shaft moves between the rest position to the final position.

18. The headrest according to claim 17, wherein the drive device comprises a pyrotechnic load situated in the housing and adapted to act upon the shaft to cause the shaft to move between the rest position and the final position.

19. The headrest according to claim 17, wherein the driven element is positioned between first and second opposing drive plates and wherein the drive guide comprises a body that is connected to the fixed part, the drive guide having first and second opposing side arms that each project out of the body, the first and second drive plates and the first and second side arms having complementary geometries that result in each of the first and second side arms being guided within each of the first and second guide plates, respectively.

20. A headrest according to claim 16, wherein the retaining mechanism comprises at least one moving hook connected to the moving part and at least one fixed hook connected to the drive device, the at least one fixed hook having at least one arm, the moving hook and the arm being connected in an area of connection when the moving part is in the rest position.

21. The headrest according to claim 14, wherein the connection assembly delimits the furthest position the moving part is able to be rotated away from the fixed part, the furthest position corresponding to the active position of the moving part.

22. The headrest according to claim 14, wherein the connection assembly comprises a curved arm having a first end pivotally connected to the moving part, the fixed part having a channel that receives the curved arm, the curved arm and channel defining the rotation path of the moving part as it moves from the rest position to the active position.

23. The headrest according to claim 14, wherein the connection assembly comprises first and second curved lateral arms, each of the first and second curved lateral arms having a first end connected to the moving part, the fixed part having first and second channel that respectively receive the first and second curved lateral arms, the first and second curved lateral arms and the first and second channels defining the rotation path of the moving part as it moves from the rest position to the active position.

24. A headrest according to claim 23, wherein the connection assembly comprises an upper arm having two side levers, each of the side levers having a first end pivotally connected to the fixed part and a second end pivotally connected to the moving part.

* * * * *